Jan. 31, 1933.  E. RECKMEIER  1,895,555
THREE-COLOR PHOTOGRAPHIC CAMERA
Filed June 11, 1930
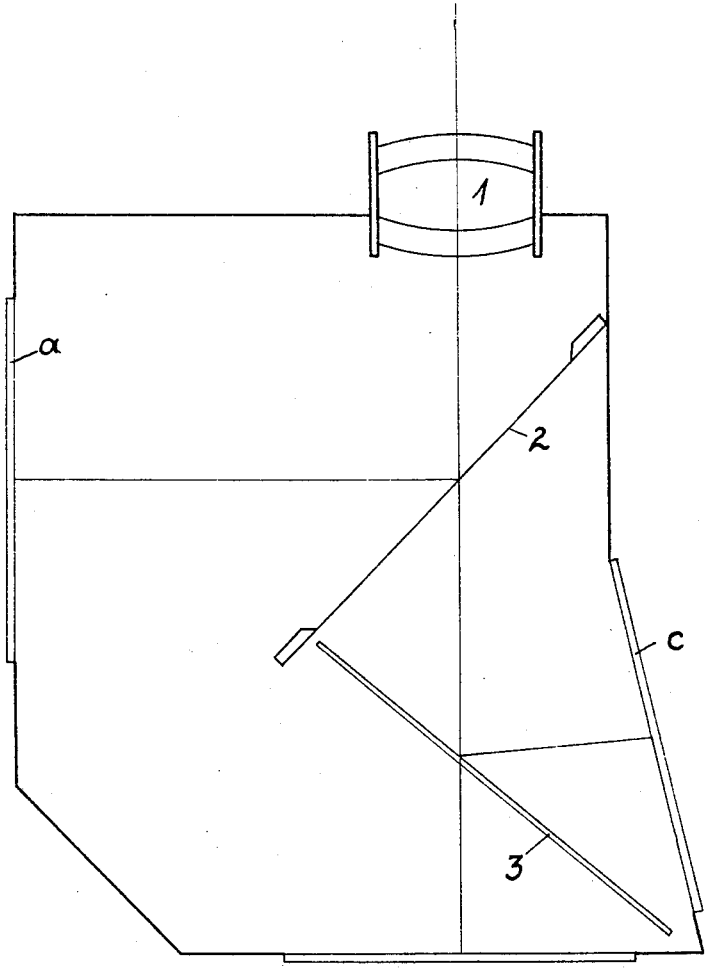
Inventor
Emil Reckmeier
By B Linger, Atty Patented Jan. 31, 1933

1,895,555

UNITED STATES PATENT OFFICE

EMIL RECKMEIER, OF BERLIN, GERMANY

THREE-COLOR PHOTOGRAPHIC CAMERA

Application filed June 11, 1930, Serial No. 460,488, and in Germany September 25, 1929.

Three-color cameras with two transparent and at the same time reflecting mirrors being placed between the object-glass and the photographic plates are not unknown. Glass-mirrors are usually employed for this purpose. To eliminate the defects caused by the thickness of the glass-mirrors and the double-reflection effected thereby three-color cameras have also been already equipped with two thin skin-mirrors. With such a camera provided with a skin-mirror, faultness partial negatives can be attained. But it is difficult to amalgamate such a skin-mirror transparently in an exactly adjustable manner.

Recent experiments have shown that the special arrangement made according to the invention and shown in the drawing in section gives a really good photographic camera.

Two mirrors being pervious to light are placed at a suitable angle to the axis of the object-glass in the course of rays going from the object-glass 1 to the photographic plates. The mirror 2 which is placed next to the object-glass is a thin skin-mirror without foil being spanned upon a frame; the other mirror 3 is a glass-mirror which is transparently coated with mirror-metal.

It has been shown that the quantity of light reflected by the skin-mirror without foil is only sufficient for producing the yellow-print plate $a$ when a violet (blue) filter is intercalated. The mirror 3 is covered on its front surface with mirror-metal being pervious to light; the reflected view of this front surface is projected to the photographic plate $c$.

The formation of a reflected view at the back of the mirror 3 which in case of strong contrasts of light would interfere as a double view with the photographic plate, is prevented either by producing the mirror 3 out of glass being colored throughout its whole mass or by covering the back surface with a filtering coat which is complementary to the light-filter of the photographic plate.

The novelty of the invention is the special arrangement of a three-color camera with one skin-mirror and one glass-mirror as described above. With regard to other three-color cameras known it has the advantage that the three partial photographs are absolutely free of parallax to each other and are without faults of distortion and without double contours. Owing to the advantageous adjustability of the distribution of light under the three partial photographs the loss of light and thus the time of exposure is also reduced to a minimum.

Three-color cameras are known having two simultaneously reflecting mirrors which allow the light to pass through and which are placed between the objective and the exposure plates.

Heretofore, disks of glass were used as mirrors. Such glass mirrors presented, however, certain inconveniences in connection with separate picture portions. The light rays coming from the exposure objective are affected in passing through the mirror plates. By reason of the fractioning of the light rays in the mirrors which allow the light to pass through, the part pictures are distorted. The distortion depends upon the thickness of the glass mirror, that is, the thicker the mirror the greater the distortion. Glass mirrors arranged in cameras of this type reflect on the front portion a part of the light coming from the objective. This reflecting light serves for the production of a negative which serves as color part negative but light reflections also take place on the back of the mirror. This reflection on the back means a loss of light and, while slight, it acts in a disturbing manner in taking pictures of objects showing considerable contrast as in this case the objects are depicted doubly on the exposure plates. According to the thickness of the mirror the weak reflection picture of the back of the mirror is present at a definite distance along with the reflection picture proper of the top portion of the mirror.

If a glass mirror of this type is at the same time made as a filter, the double picture can be rendered ineffective but also in this case there are losses of light caused by the light reflection on the back of the mirror as in double reflections of a mirror, a slight amount of light will always pass through directly.

The disadvantages of mirror plates consist, therefore, in that they act in a picture distorting manner and further that they produce double pictures because of their reflection on the back and also cause loss of light.

On the other hand, the glass mirrors are to be preferred as regards distribution of the light to the separate exposure plates. Corresponding to the sensitivity to light of the exposure material, the reflection and penetration of the mirrors must be determined. This can be done in an exact manner by coating the mirror with mirror metal.

The drawbacks produced by the thickness of the mirror plates may be overcome by using extremely thin mirrors, for example of approximately 0.01 mm. thickness which, in practice, is not possible when made of glass. For this reason other means have been resorted to. If, for example, a solution of gelatin is poured upon a mirror plate and is withdrawn dry in the form of a skin, this skin being then stretched and glued on a plane ground frame and the frame then placed at a suitable angle to the axis of the objective in a color camera, the thin plane skin will act as a mirror. The ability to reflect on the part of the skin is not particularly great, but it suffices for the production of the blue-filter negative which requires the least light compared with the other parts of the picture. The quantity of light passing through the skin mirror is divided into red and green filter negatives. Such known skin mirrors may be made of gelatin, collodion, celluloid, cellophane and the like.

The use of such skin mirror overcomes distortion of pictures as well as double pictures but reflection and penetration of the light therein can only be changed with great difficulty. Covering them with mirror metal in an exactly predetermined quantity is extremely difficult. A three-color camera with two skin mirrors would give undistorted exposures without double contours, but the rear exposure plate would get too much light and this excess quantity would have to be rendered ineffective which could only be done with loss of light.

By the present invention the advantages of a skin mirror are combined with those of a glass mirror in that only one skin mirror and one glass mirror are used. The skin mirror permits of taking pictures free from distortion and free from double contours and its ability to reflect suffices for the production of the blue-filter exposure. The quantity of light passing through the skin mirror on to the glass mirror is in proper proportion to the reflecting quantity and is divided by the glass mirror by mirror coating in exactly predetermined quantities upon the two remaining exposure plates.

By using one glass mirror the distortion and loss of light by double reflection is less than when two glass mirrors are used. Furthermore, in using one glass mirror, the double picture can easily be removed by a color filtering arrangement and the slight distortion produced with one glass mirror can be overcome by suitable steps being taken, for example by placing the exposure plate in a slightly oblique position to the axis of the objective.

Where two glass mirrors are used, these steps can only be carried out with considerable difficulty.

The light coming from the objective is thus used to the best advantage in the present arrangement. The division of the light takes place in an exactly suitable proportion so that there is no excess of light in any part exposure which would have to be dampened; thus correspondingly short exposures are required.

What I claim as my invention, and desire to secure by Letters Patent, is—

A three-color camera comprising an objective lens, a photographic plate and a pair of diagonally placed mirrors so arranged that the light coming from an object to be reproduced is distributed by the two diagonally placed mirrors to the three color negatives by inserting color filters, one of said mirrors being a skin mirror arranged nearest the lens, the violet (blue) filter being placed in the ray passage of the reflection picture of the skin mirror and the other mirror being a glass mirror so that the light striking the same is distributed correspondingly to the two remaining negatives.

In testimony whereof I affix my signature.

EMIL RECKMEIER.